Figure 1:
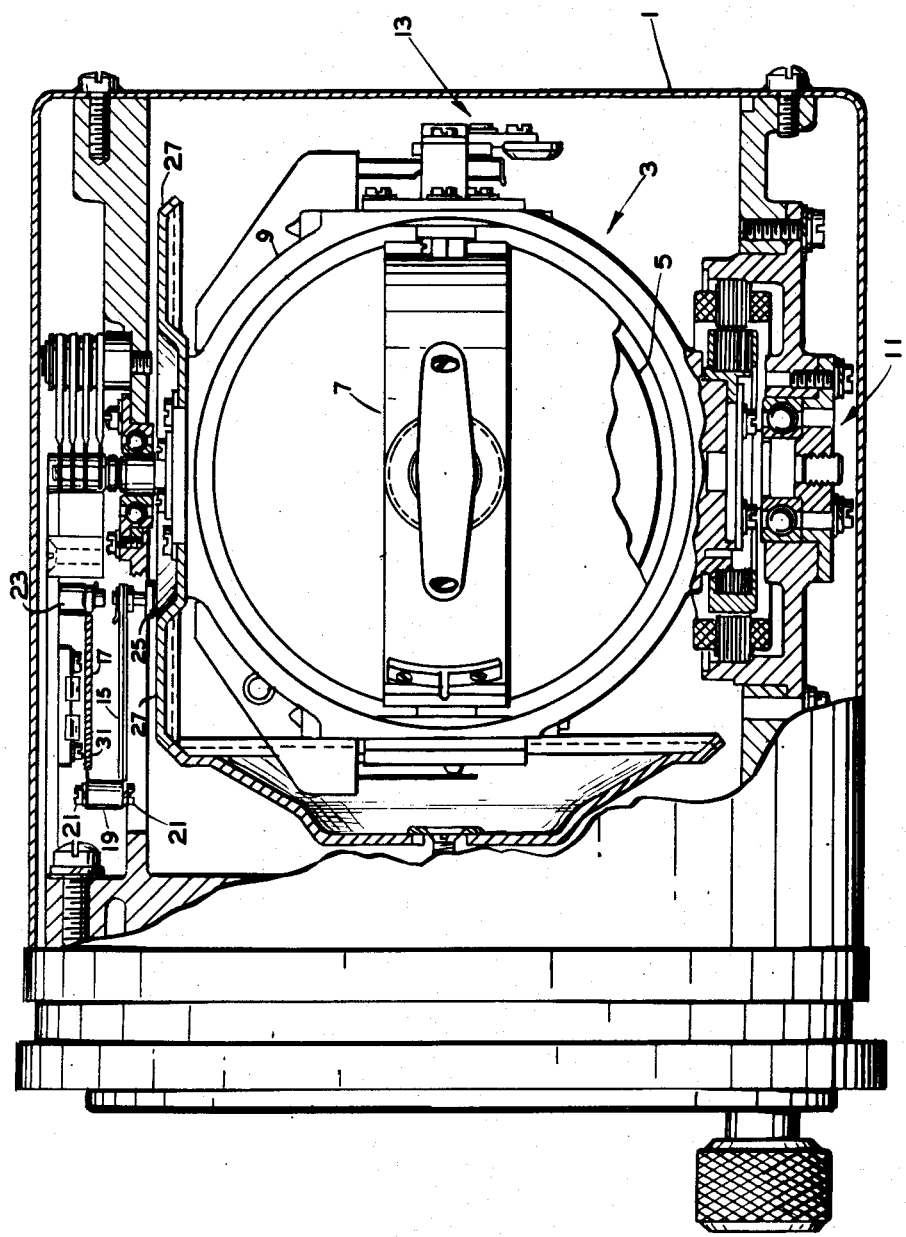

July 21, 1953 C. E. HURLBURT ET AL 2,645,942
GYROSCOPE
Filed Nov. 21, 1951 2 Sheets-Sheet 1

INVENTORS
CHARLES E. HURLBURT
GERHARD W. BOEHM
BY
ATTORNEY

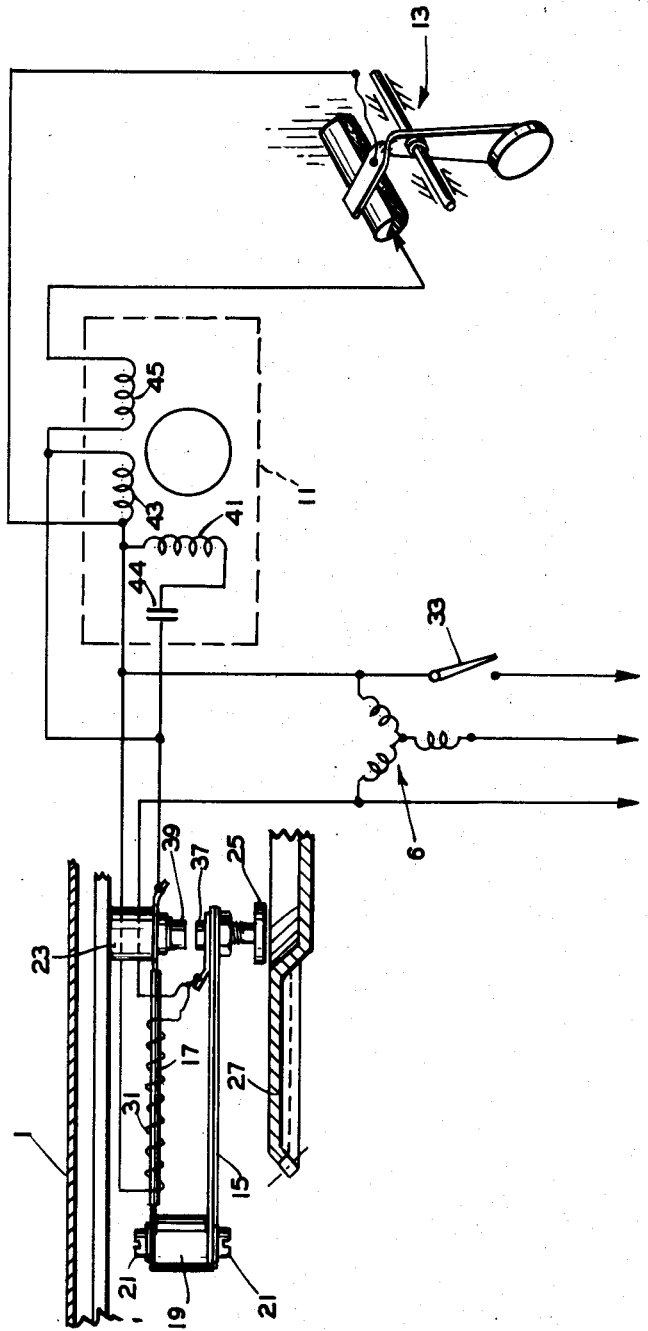

Patented July 21, 1953

2,645,942

UNITED STATES PATENT OFFICE 2,645,942

GYROSCOPE

Charles E. Hurlburt, Teaneck, and Gerhard W. Boehm, West Englewood, N. J., assignors to Bendix Aviation Corporation, Teterboro, N. J., a corporation of Delaware Application November 21, 1951, Serial No. 257,503

11 Claims. (Cl. 74—5.47)

The invention relates generally to instruments to be used on aircraft and more particularly to indicating instruments using a gyroscope.

The invention is embodied in a directional gyroscope indicator, but in its broader aspects the invention may be incorporated in any type gyroscope which is subject to nutation when starting or to rotation of the rotor supports as the rotor comes to rest.

One object of the present invention is to prevent nutation of the gyroscope when starting the gyroscope.

Another object is to restrain movement of the gyroscope about one axis of freedom until the gyroscope rotor has attained a predetermined speed, and thereafter to release automatically the gyroscope for normal operation.

Another object is to prevent rotation of the rotor supports as the rotor comes to rest.

A further object is to restrain movement of the gyroscope about one axis of freedom as the rotor comes to rest and while the rotor is de-energized.

Another object is to provide a locking arrangement which restrains movement of the gyroscope about one axis of freedom when the gyroscope is de-energized and which releases the gyroscope a predetermined time after the motor driving the rotor is energized.

A further object is to provide a locking arrangement which is self-compensating for accommodating changes in ambient temperature.

Another object is to render the erection motor inoperative until the rotor has attained a predetermined speed.

The invention contemplates a gyroscope having a rotor adapted to spin about one axis and mounted for angular movement about mutually perpendicular axes. A pair of bimetal elements closely associated with one another restrain movement of the gyroscope about one of the mutually perpendicular axes. A heater associated with one of the elements flexes the element to release the gyroscope a predetermined interval after it is energized. The bimetal elements may mount contacts which energize an erection motor, after the rotor attains a predetermined speed, to maintain the rotor spin axis in a predetermined attitude.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for the purpose of illustration and description only, and are not intended as a definition of the limits of the invention.

In the drawings, Figure 1 is in part an elevation view and in part a vertical section showing a directional gyroscope indicator constructed according to the invention, and Figure 2 is a wiring diagram showing the electrical connections in the instrument.

Referring now to the drawings for a more detailed description of the novel directional gyroscope indicator of the present invention, the indicator is shown therein as comprising a housing 1 enclosing a three-degree-of-freedom gyroscope 3 having a rotor 5 driven by a three-phase motor 6 and supported by an inner gimbal 7 for rotation about a horizontal axis and having an outer gimbal 9 mounting inner gimbal 7 for angular movement about an axis perpendicular to the spin axis. Gimbal 9 is mounted for angular movement in housing 1 about an axis perpendicular to the last mentioned axis. The spin axis is maintained horizontal by an erection motor 11 controlled by a pendulous switch 13.

A brake is provided for locking outer gimbal 9 against movement relative to the instrument housing to prevent the gimbals from spinning as the rotor comes to rest after motor 6 is de-energized and to prevent nutation of the gyroscope when motor 6 is energized and before rotor 5 has attained operating speed. The brake comprises a pair of substantially identical bimetal elements 15, 17 separated from one another by a spacer 19 and secured together at one end by screws 21 or other suitable means threaded into the spacer. Element 17 is secured at its opposite end by a bracket 23 to instrument housing 1, and element 15 mounts at its opposite end an adjustable brake shoe 25 which engages a gear 27 fixed to gimbal 9 and drivably connecting the gimbal to a pointer (not shown).

A resistance heater 31 is associated with element 17 and is connected through a switch 33 to a power source. Motor 6 for driving rotor 5 is connected to the power source through switch 33 also. When switch 33 is closed, motor 6 is energized and element 17 is heated by heater 31 and flexes until brake shoe 25 releases gear 27. Rotor 5 preferably attains approximately one-half operating speed in the time required for element 17 to release gimbal 9.

By providing two identical bimetal elements 15, 17, the brake compensates for ambient temperature changes, that is, the time required for releasing the brake is substantially the same at any ambient temperature because the elements being identical remain parallel and maintain brake shoe 25 in engagement with gear 27 until heater 31 is energized, whereupon the brake disengages the gear and releases the gyroscope.

To further prevent nutation of the gyroscope while the rotor is attaining operating speed, a pair of contacts 37, 39 are mounted on bimetal elements 15, 17 and connect erection motor 11 to the power source. Contacts 37, 39 are open when the brake is engaged and close after the brake is released so that the spin axis of the gryroscope is not precessed to the horizontal until the rotor has attained at least one-half operating speed.

When motor 6 driving rotor 5 is de-energized by opening switch 33, heater 31 is de-energized and bimetal element 17 cools, whereby brake shoe 25 engages gear 27 and restrains movement of gimbal 9. As element 17 flexes during cooling, contacts 37, 39 open and the erection motor is de-energized.

Any suitable erecting arrangement may be used and the present arrangement has a two phase erection motor with a pair of field windings 41, 43 connected in parallel with one another and in series with switch 33 and contacts 37, 39 to the power source. A phasing condenser 44 is connected in series with field winding 41. Erection motor 11 also has a field winding 45 connected in parallel with windings 41, 43 to the power source and in series with pendulous switch 13. The erection motor exerts a precession force on the gyroscope in one direction when winding 45 is de-energized by the open contacts of switch 13, and exerts a precession force in the other direction when winding 45 is energized by the closed contacts of switch 13.

The arrangement described prevents spinning of the gimbals when the gyroscope is de-energized and the rotor comes to rest by locking the outer gimbal against movement relative to the housing. After the gyroscope is energized, the outer gimbal is held against movement until the rotor has attained a predetermined speed to prevent nutation of the gyroscope, and the gimbal thereafter is released automatically for normal operation of the gyroscope. The erection motor is rendered inoperative at least until the rotor has attained the predetermined speed. The locking arrangement is self-compensating for accommodating changes in ambient temperature so that the gimbal is released a predetermined time after the motor driving the rotor is energized irrespective of the ambient temperature.

Although but one embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art.

We claim:

1. In a gyroscope instrument of the kind described, a gyroscope having a spinning rotor mounted for angular movement about mutually perpendicular axes, brake means comprising a pair of bimetal elements secured together and closely associated with one another, said bimetal elements in one position restraining angular movement of said rotor about one of said axes irrespective of the position of said rotor about said one axes and in another position releasing said rotor for angular movement about said one axis, and electrical means associated with one of said bimetal elements for controlling its position.

2. In a gyroscope instrument of the kind described, a gyroscope having a spinning rotor mounted for angular movement about mutually perpendicular axes, brake means comprising a pair of substantially identical bimetal elements secured together and closely associated with one another to compensate for ambient temperature changes, said bimetal elements in one position restraining angular movement of said rotor about one of said axes irrespective of the position of said rotor about said one axis and in another position releasing said rotor for angular movement about said one axis, and a heater associated with one of said elements for flexing said one element relative to the other element to control the position of said elements.

3. In a gyroscope instrument of the kind described, a three-degree-of-freedom gyroscope having a spinning rotor mounted in inner and outer supports for angular movement about mutually perpendicular axes, brake means comprising a pair of bimetal elements secured together and closely associated with one another, said bimetal elements in one position restraining movement of said outer support irrespective of the angular position of said outer support and in another position releasing said outer support, and electrical means associated with one of said bimetal elements for controlling its position.

4. In a gyroscope instrument of the kind described, a three-degree-of-freedom gyroscope having a spinning rotor mounted in inner and outer supports for angular movement about mutually perpendicular axes, brake means comprising a pair of bimetal elements secured together and extending adjacent to one another in spaced relation to compensate for changes in ambient temperature, said bimetal elements in one position restraining movement of said outer support irrespective of the angular position of said outer support and in another position releasing said outer support, and a heater associated with one of said bimetal elements for flexing said one element relative to the other element to control the position of said elements.

5. In a gyroscope instrument of the kind described, an instrument housing, a three-degree-of-freedom gyroscope having a spinning rotor mounted in inner and outer supports for angular movement in said housing about mutually perpendicular axes, brake means for restraining movement of said outer support relative to said housing irrespective of the angular position of said outer support and comprising a pair of bimetal elements secured together and closely associated with one another, one of said elements being secured to said housing and the other element in one position engaging said outer support, and in another position releasing said outer support, and electrical means associated with said bimetal elements for controlling their position.

6. In a gyroscope instrument of the kind described, an instrument housing, a three-degree-of-freedom gyroscope having a spinning rotor mounted in inner and outer supports for angular movement in said housing about mutually perpendicular axes, brake means for restraining movement of said outer support relative to said housing irrespective of the angular position of said outer support and comprising a pair of bimetal elements secured together at one end and closely associated with one another to compensate for changes in ambient temperature, one of said elements being secured at its opposite end to said housing and the opposite end of said other element in one position engaging said outer support and in another position releasing said outer support, and a heater associated with one of said bimetal elements for flexing said one element relative to the other element to control the position of said elements.

7. In a gyroscope instrument of the kind described, a gyroscope having a spinning rotor mounted for angular movement about mutually perpendicular axes, erecting means for said gyroscope to maintain the spinning rotor in a predetermined attitude, and time-delay means comprising a pair of bimetal elements energized by a heater for energizing said erecting means a predetermined time after said rotor begins to spin.

8. In a gyroscope intrument of the kind described, a gyroscope having a spinning rotor mounted for angular movement about mutually perpendicular axes, an erection motor adapted to maintain the spinning rotor in a predetermined attitude, means for energizing said erection motor a predetermined time after the rotor begins to spin and comprising a pair of bimetal elements secured together and closely associated with one another to compensate for changes in ambient temperature, switch means controlled by said bimetal elements for operating said erection motor, and a heater associated with said bimetal elements for controlling the position of said bimetal elements and operating said switch means a predetermined time after said heater is energized.

9. In a directional gyroscope indicator, a three-degree-of-freedom gyroscope having a rotor spinning about a horizontal axis, an erection motor for maintaining said spin axis horizontal, brake means for restraining one degree of freedom of said spinning rotor and comprising a pair of bimetal elements secured together and closely associated with one another, a heater associated with said bimetal elements for flexing one of said bimetal elements relative to the other element for releasing said brake, and switching means operated by said bimetal elements for controlling operation of said erection motor.

10. In a gyroscope instrument of the kind described, a gyroscope having a spinning rotor mounted for angular movement about mutually perpendicular axes, brake means comprising a pair of bimetal elements secured together and closely associated with one another, said bimetal elements in one position restraining angular movement of said rotor about one of said axes and in another position releasing said rotor for angular movement about said one axis, electrical means associated with one of said bimetal elements for controlling its position, an erection motor for precessing the spinning rotor to a predetermined attitude, and switch means controlled by said bimetal elements for energizing said erection motor when the rotor is spinning at a predetermined minimum speed.

11. In a gyroscope instrument of the kind described, a gyroscope having a spinning rotor mounted for angular movement about mutually perpendicular axes, brake means comprising a pair of substantially identical bimetal elements secured together and closely associated with one another to compensate for ambient temperature changes, said bimetal elements in one position restraining angular movement of said rotor about one of said axes and in another position releasing said rotor for angular movement about said one axis, a heater associated with one of said elements for flexing said one element relative to the other element to control the position of said elements, an erection motor for precessing the spinning rotor to a predetermined attitude, and contacts on said bimetal elements for energizing said erection motor when the rotor is spinning at a predetermined minimum speed.

CHARLES E. HURLBURT.
GERHARD W. BOEHM.

References Cited in the file of this patent

UNITED STATES PATENTS

| Number | Name | Date |
|---|---|---|
| 2,441,307 | Alkan | May 11, 1948 |
| 2,524,553 | Wendt | Oct. 3, 1950 |
| 2,588,607 | Barkalow | Mar. 11, 1952 |

FOREIGN PATENTS

| Number | Country | Date |
|---|---|---|
| 597,282 | Great Britain | Jan. 22, 1948 |